(12) United States Patent
Sugihara

(10) Patent No.: US 10,721,440 B2
(45) Date of Patent: Jul. 21, 2020

(54) VIDEO CONFERENCING APPARATUS AND VIDEO CONFERENCING METHOD

(71) Applicant: KYOCERA Document Solutions Inc., Osaka-shi, Osaka (JP)

(72) Inventor: Hiroshi Sugihara, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days.

(21) Appl. No.: 16/582,144

(22) Filed: Sep. 25, 2019

(65) Prior Publication Data

US 2020/0099889 A1    Mar. 26, 2020

(30) Foreign Application Priority Data

Sep. 25, 2018   (JP) .................................. 2018-178613

(51) Int. Cl.
| | |
|---|---|
| *H04N 7/15* | (2006.01) |
| *H04L 12/18* | (2006.01) |
| *H04M 3/56* | (2006.01) |
| *H04L 9/06* | (2006.01) |
| *H04L 29/06* | (2006.01) |

(52) U.S. Cl.
CPC ............ *H04N 7/15* (2013.01); *H04L 12/1827* (2013.01); *H04L 12/1831* (2013.01); *H04L 65/403* (2013.01); *H04M 3/567* (2013.01)

(58) Field of Classification Search
USPC .... 348/14.08, 14.09, 14.1, 211.12, 563, 569, 348/585
See application file for complete search history.

(56) References Cited

U.S. PATENT DOCUMENTS 5,615,338 A * 3/1997 Poole ....................... H04N 7/15
                                                    712/223

FOREIGN PATENT DOCUMENTS

| JP | 07-264566 | * 10/1995 | ............... H04N 7/15 |
|---|---|---|---|
| JP | H07264566 A | 10/1995 | |

* cited by examiner

*Primary Examiner* — Yosef K Laekemariam
(74) *Attorney, Agent, or Firm* — Alleman Hall Creasman & Tuttle LLP

(57) ABSTRACT

A video conferencing apparatus includes an acquisition processing portion, a calculation processing portion, and a combining processing portion. The acquisition processing portion acquires site video data that represents site videos captured at a plurality of sites. The calculation processing portion calculates respective display priorities of the sites based on evaluation values for a plurality of predetermined evaluation items. The combining processing portion generates composite video data based on the site video data acquired by the acquisition processing portion, the composite video data representing a composite video which is a combination of a plurality of site videos having display sizes corresponding to the display priorities.

8 Claims, 8 Drawing Sheets

FIG. 3

PARTICIPANT INFORMATION — D1

| NAME | SITE | IMPORTANT PERSON |
|---|---|---|
| ○○ | SITE A | × |
| △△ | SITE A | × |
| □□ | SITE A | × |
| ⋮ | ⋮ | ⋮ |
| ◇◇ | SITE B | × |
| ○◇ | SITE B | × |
| ▽▽ | SITE B | × |
| ⋮ | ⋮ | ⋮ |
| ○△ | SITE C | ○ |
| □○ | SITE C | × |
| △□ | SITE C | × |
| ⋮ | ⋮ | ⋮ |

FIG. 4

PRIORITY INFORMATION D2

| SITE | EVALUATION ITEM | | | | DISPLAY PRIORITY |
|---|---|---|---|---|---|
| | AMOUNT OF SPEECH | NUMBER OF PARTICIPANTS | SHARED IMAGE | IMPORTANT PERSON | |
| SITE A | 30 | 2 | 1.5 | 1 | 90 |
| SITE B | 40 | 1 | 1 | 1 | 40 |
| SITE C | 10 | 1.5 | 1 | 2 | 30 |
| SITE D | 10 | 1 | 1 | 1 | 10 |
| SITE E | 10 | 1.2 | 1 | 1 | 12 |
| SITE F | 0 | 3 | 1 | 1 | 0 |

VIDEO CONFERENCING APPARATUS AND VIDEO CONFERENCING METHOD

This application is based upon and claims the benefit of priority from the corresponding Japanese Patent Application No. 2018-178613 filed on Sep. 25, 2018, the entire contents of which are incorporated herein by reference.

BACKGROUND

The present disclosure relates to a video conferencing apparatus and a video conferencing method.

There is known a video conferencing system in which videos of a plurality of conference rooms are arranged in one screen, wherein a video of a conference room including a participant who is speaking with a largest voice, is displayed larger than videos of the other conference rooms.

SUMMARY

A video conferencing apparatus according to an aspect of the present disclosure includes an acquisition processing portion, a calculation processing portion, and a combining processing portion. The acquisition processing portion acquires site video data that represents site videos captured at a plurality of sites. The calculation processing portion calculates respective display priorities of the sites based on evaluation values for a plurality of predetermined evaluation items. The combining processing portion generates composite video data based on the site video data acquired by the acquisition processing portion, the composite video data representing a composite video which is a combination of a plurality of site videos having display sizes corresponding to the display priorities.

In a video conferencing method according to another aspect of the present disclosure, one or more processors execute an acquisition step, a calculation step, and a combining step. In the acquisition step, site video data that represents site videos captured at a plurality of sites is acquired. In the calculation step, respective display priorities of the sites are calculated based on evaluation values for a plurality of predetermined evaluation items. In the combining step, composite video data is generated based on the site video data acquired in the acquisition step, the composite video data representing a composite video which is a combination of a plurality of site videos having display sizes corresponding to the display priorities.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a diagram showing an example of participant information used in the video conferencing apparatus according to the embodiment of the present disclosure.

FIG. 4 is a diagram showing an example of priority information used in the video conferencing apparatus according to the embodiment of the present disclosure.

DETAILED DESCRIPTION

The following describes an embodiment of the present disclosure with reference to the accompanying drawings for the understanding of the present disclosure. It should be noted that the following embodiment is an example of a specific embodiment of the present disclosure and should not limit the technical scope of the present disclosure.

[Configuration of Video Conferencing System]

Figure 1:
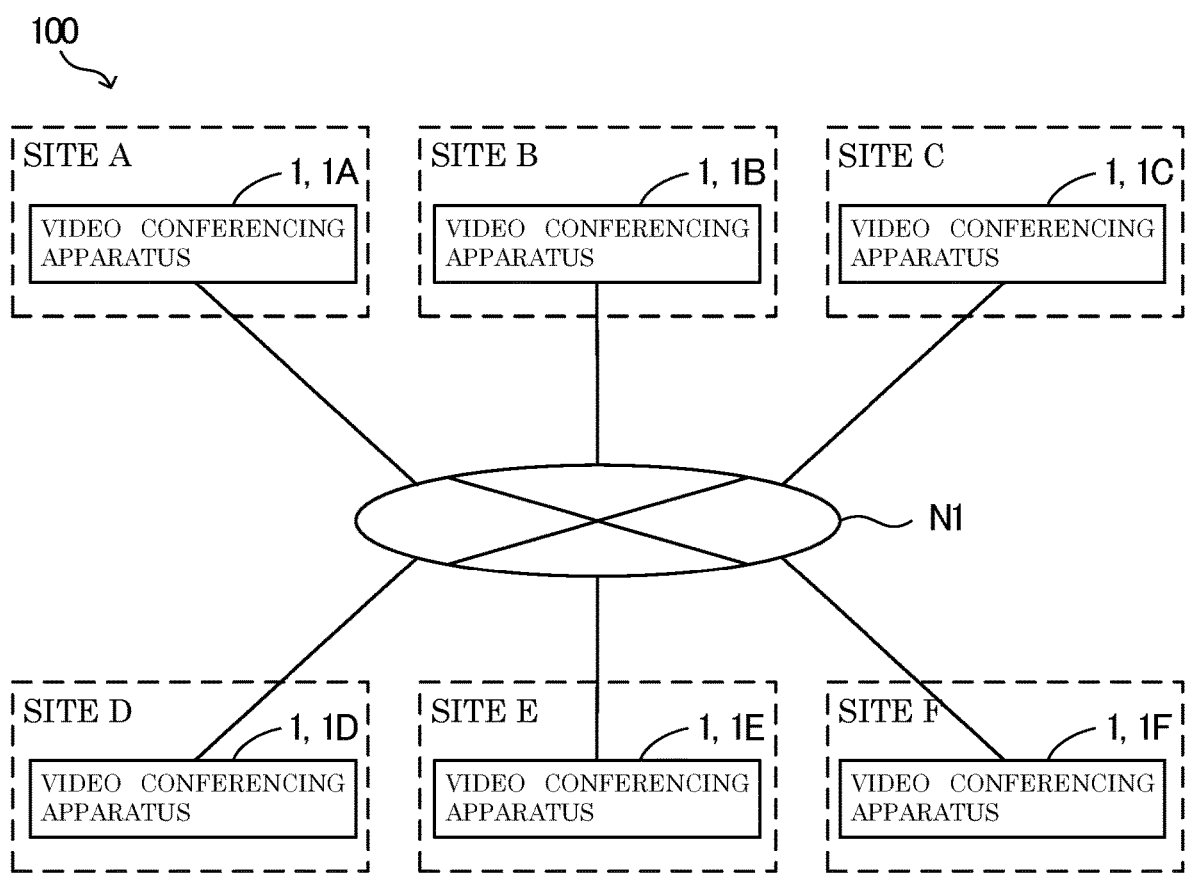
FIG. 1 is a block diagram showing a configuration of a video conferencing system according to an embodiment of the present disclosure.

As shown in FIG. 1, a video conferencing system 100 according to the embodiment of the present disclosure includes a plurality of video conferencing apparatuses 1 that are connected with each other so as to be communicable through a communication network N1 such as the Internet or a LAN. Specifically, the video conferencing system 100 includes a video conferencing apparatus 1A installed at a site A, a video conferencing apparatus 1B installed at a site B, a video conferencing apparatus 1C installed at a site C, a video conferencing apparatus 1D installed at a site D, a video conferencing apparatus 1E installed at a site E, and a video conferencing apparatus 1F installed at a site F. It is noted that the number of the video conferencing apparatuses 1 included in the video conferencing system 100 is not limited to six, but may be less than six or seven or more.

[Configuration of Video Conferencing Apparatus]

Figure 2:
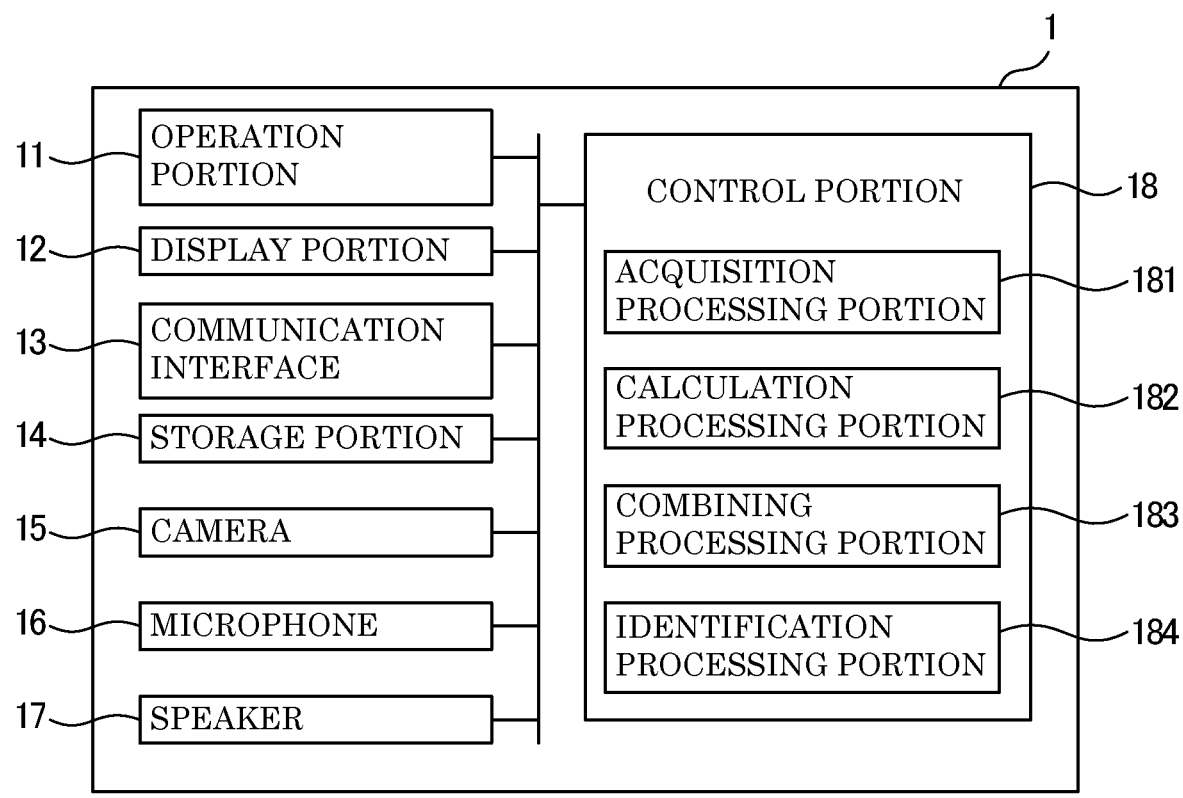
FIG. 2 is a block diagram showing a system configuration of a video conferencing apparatus according to the embodiment of the present disclosure.

As shown in FIG. 2, the video conferencing apparatus 1 includes an operation portion 11, a display portion 12, a communication interface 13, a storage portion 14, a camera 15, a microphone 16, a speaker 17, and a control portion 18.

The operation portion 11 is configured to receive user operations, and, for example, is a remote controller operated by each participant of a video conferencing.

The display portion 12 is configured to display information such as a composite video that is a combination of site videos of a plurality of sites, and, for example, is a liquid crystal display.

The communication interface 13 is configured to perform data communications with the other video conferencing apparatuses 1.

The storage portion 14 is a nonvolatile storage device such as a hard disk or an EEPROM (registered trademark). The storage portion 14 stores various control programs that are executed by the control portion 18. The control programs executed by the control portion 18 include a video conferencing program that causes the control portion 18 to execute a composite video generating process (see FIG. 5) that is described below.

In addition, the storage portion 14 stores, for example, participant information D1 (see FIG. 3) and priority information D2 (see FIG. 4). The participant information D1 includes information concerning the participants of the video conferencing. The priority information D2 includes information concerning priorities of the site videos of the sites displayed on the display portion 12.

The camera 15 is configured to capture a video of each site (hereinafter the video is referred to as a site video). The site videos captured by the cameras 15 include videos of participants of the video conferencing.

The microphone 16 is configured to collect a sound at each site (hereinafter the sound is referred to as a site sound). The site sound collected by the microphone 16 includes voices of participants of the video conferencing. One microphone 16 may be provided for each site or each participant.

The speaker 17 is configured to output, for example, the site sounds of the other sites received via the communication interface 13.

The control portion 18 includes control equipment such as a CPU, a ROM, and a RAM. The CPU is a processor configured to execute various calculation processes. The ROM is a nonvolatile storage device in which information such as the control programs that cause the CPU to execute various processes, is preliminarily stored. The RAM is a volatile or nonvolatile storage device that is used as a temporary storage memory (working area) for the various processes executed by the CPU.

Meanwhile, there is known a video conferencing system in which videos of a plurality of conference rooms (sites) are arranged in one screen, wherein a video of a conference room including a participant who is speaking with a largest voice, is displayed larger than videos of the other conference rooms. However, according to the video conferencing system, if the conference room including the participant speaking with the largest voice frequently changes, display sizes of the videos of the conference rooms will vary at the dizzying pace. On the other hand, according to the video conferencing apparatus 1 of the present embodiment, it is possible to appropriately control display sizes of the site videos captured at the sites.

Specifically, the control portion 18 includes an acquisition processing portion 181, a calculation processing portion 182, a combining processing portion 183, and an identification processing portion 184. It is noted that the control portion 18 functions as these processing portions by executing various processes in accordance with the video conferencing program. The present invention may be recognized as a video conferencing method in which the control portion 18 executes the various processes in accordance with the video conferencing program. In addition, the control portion 18 may include an electronic circuit, such as ASIC (Application Specific Integrated Circuit), that realizes a part or all of processing functions of these processing portions.

The acquisition processing portion 181 acquires site video data that represents the site videos captured at the sites. Specifically, the acquisition processing portion 181 receives, via the communication network N1, site videos captured at sites (hereinafter referred to as "the other sites") at which the other video conferencing apparatuses 1 (hereinafter referred to as "the other apparatuses") are installed. In addition, the acquisition processing portion 181 acquires a site video captured at its own site (hereinafter referred to as an "own site") at which its own video conferencing apparatus 1 (hereinafter, referred to as an "own apparatus") is installed, from the camera 15 of the own apparatus.

The calculation processing portion 182 calculates display priorities of the sites based on evaluation values for a plurality of predetermined evaluation items. Specifically, the calculation processing portion 182 calculates evaluation values for four evaluation items ("amount of speech", "number of participants", "shared image", and "important person") shown in FIG. 4, with regard to each of the sites, and calculates the display priorities of the sites based on the evaluation values for these evaluation items.

The evaluation item "amount of speech" is related to the amount of speech of the participant(s) at each site. The evaluation value for "amount of speech" is calculated based on the duration (hereinafter referred to as "speech duration") for which the participants of the site spoke within a predetermined time period (for example, most recent three minutes). In the present embodiment, the longer the speech duration is, the larger the evaluation value for "amount of speech" is. It is noted that the speech duration is detected, for example, based on site sound data that represents the site sound collected at the site.

The evaluation item "number of participants" is related to the number of participants at each site. In the present embodiment, the larger the number of participants is, the larger the evaluation value for "number of participants" is. For example, the number of participants at each site is calculated based on the participant information D1 shown in FIG. 3. It is noted that information of each participant included in the participant information D1 is, for example, input through the operation portion 11 of the video conferencing apparatus 1 before the video conferencing is started. It is noted that as another embodiment, a known face detection process may be executed on the site video of each site to detect the number of participants at each site.

The evaluation item "shared image" is related to whether a shared image is provided from a site to another site. The shared image is, for example, an image of a screen of application software (for example, presentation software or spreadsheet software) executed on a personal computer, or an image of conferencing materials captured by a document camera. In the present embodiment, a site providing a shared image has a larger evaluation value for "shared image" than a site not providing a shared image.

It is noted that the shared image may be provided to another site as a site video of the site, or may be overlaid on the site video as a part of the site video. Alternatively, the shared image may be provided to another site independent of the site video of the site. A site providing a shared image is, for example, identified based on an image sharing start operation performed on the operation portion 11.

The evaluation item "important person" is related to whether a specific person(s) is present at the site. The important person is, for example, a director, a person in charge, or a leader in an organization, or a facilitator of the video conferencing. In the present embodiment, a site at which a specific person(s) is included in the participants has a larger evaluation value for "important person" than a site at which a specific person(s) is not included in the participants. It is detected whether or not a specific person(s) is included in the participants in the site, based on the participant information D1 shown in FIG. 3, for example.

The calculation processing portion 182 calculates the evaluation values for the four evaluation items "amount of speech", "number of participants", "shared image", and "important person" with regard to each of the sites, and stores the calculation results as the priority information D2. Furthermore, the calculation processing portion 182 calculates the display priority of each of the sites by multiplying the evaluation values for the four evaluation items, and stores calculated display priorities as the priority information D2.

It is noted that in the present embodiment, the display priority of each site is calculated based on the evaluation values for the four evaluation items "amount of speech", "number of participants", "shared image", and "important person". However, as another embodiment, the calculation processing portion 182 may calculate the display priority of each site based on the evaluation values for two or three evaluation items among the four evaluation items. That is, the calculation processing portion 182 may calculate the display priority of each site based on the evaluation values for at least two evaluation items among the four evaluation items. In addition, as a further embodiment, the calculation processing portion 182 may calculate the display priority of each site based on evaluation values for one or more arbitrary evaluation items other than the four evaluation items shown in FIG. 4.

The combining processing portion 183 generates composite video data based on the site video data acquired by the acquisition processing portion 181, wherein the composite video data represents a composite video which is a combination of a plurality of site videos having display sizes corresponding to the display priorities.

For example, the combining processing portion 183 selects, based on the display priorities, one layout pattern from a plurality of predetermined layout patterns each showing a layout of the plurality of site videos in the composite video, and generates the composite video data based on the selected layout pattern. Specifically, the combining processing portion 183 selects, based on the display priorities, one layout pattern from the three layout patterns (A) to (C) shown in FIG. 7.

Figure 7:
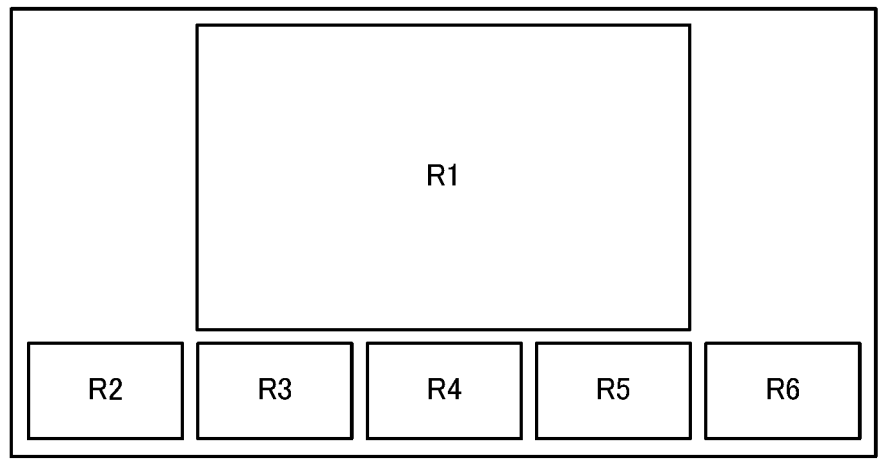
FIGS. 7(A) to (C) are diagrams showing examples of layout patterns used in the video conferencing apparatus according to the embodiment of the present disclosure.
Figure 7:
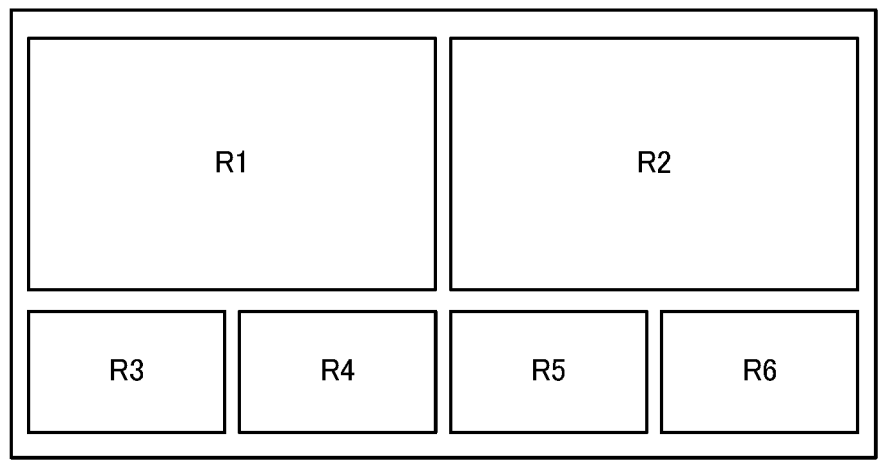
Figure 7:
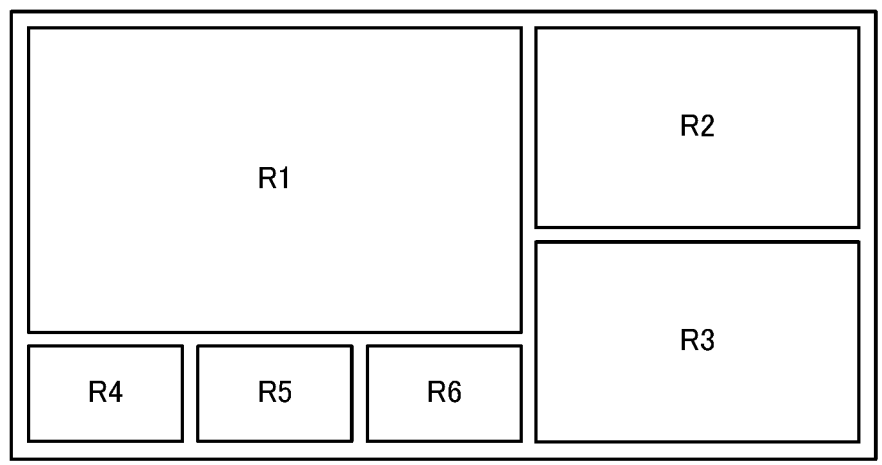

Each of the three layout patterns (A) to (C) shown in FIG. 7 includes site video display regions R1 to R6. The site video display region R1 is a display region in which a site video of a site having the first priority (namely, a site having the highest display priority) is displayed. The site video display region R2 is a display region in which a site video of a site having the second priority (namely, a site having the second highest display priority) is displayed. The site video display region R3 is a display region in which a site video of a site having the third priority (namely, a site having the third highest display priority) is displayed. The site video display region R4 is a display region in which a site video of a site having the fourth priority (namely, a site having the fourth highest display priority) is displayed. The site video display region R5 is a display region in which a site video of a site having the fifth priority (namely, a site having the fifth highest display priority) is displayed. The site video display region R6 is a display region in which a site video of a site having the sixth priority (namely, a site having the sixth highest display priority) is displayed.

For example, the combining processing portion 183 selects a layout pattern based on the number of sites that each have a display priority higher than a predetermined threshold. For example, when only one of the plurality of sites has a display priority higher than the threshold, the combining processing portion 183 selects the layout pattern (A) shown in FIG. 7; when two of the plurality of sites have display priorities higher than the threshold, the combining processing portion 183 selects the layout pattern (B) shown in FIG. 7; and when three of the plurality of sites have display priorities higher than the threshold, the combining processing portion 183 selects the layout pattern (C) shown in FIG. 7. It is noted that the threshold may be a predetermined fixed value, or may be determined based on calculation results of the calculation processing portion 182. For example, the threshold may be determined based on an average value of the display priorities of the plurality of sites.

In addition, when a name of a preliminarily registered participant is detected from the site sounds collected at the sites, the combining processing portion 183 may enlarge the display size of the site video of the site at which the participant is present. For example, the combining processing portion 183 converts the site sounds to text data by executing a known voice recognition process on the site sound data representing the site sounds of the sites. Subsequently, when a name of a participant included in the participant information D1 shown in FIG. 3 is detected from the text data, the combining processing portion 183 enlarges the display size of the site video of the site at which the participant (namely, a participant whose name was called) is present. In the video conferencing, when a name of a participant is called, it is highly possible that the called participant speaks next. As a result, by enlarging the display size of the site video of the site at which a participant whose name was called is present, it is possible to enlarge the display size of the site video of the site before the participant starts speaking.

As one method of enlarging the display size of a site video of a site, for example, the priority of the site may be raised (for example, to the first priority, to a priority that is higher by one than the current priority, or to a priority that is higher by two than the current priority). This allows the site video of the site to be displayed in a site video display region of a larger size (for example, in the site video display region R1 or in the site video display region R2). It is noted that as another method of enlarging the display size of the site video of the site, the display priority of the site may be raised.

When it is detected that an unmute operation has been performed at any one of the sites, the combining processing portion 183 may enlarge the display size of the site video of the site. The unmute operation is performed to release a state (a mute state) where collection of sound by the microphone 16 is temporarily stopped, and allow the microphone 16 to resume collecting the sound. The unmute operation is received, for example, via the operation portion 11. Upon receiving a signal indicating a performance of the unmute operation from a video conferencing apparatus 1 of a site, the combining processing portion 183 enlarges the display size of the site video of the site. When a participant at a site performs the unmute operation, it means that the participant is going to start speaking. As a result, by enlarging the display size of the site video of the site where the unmute operation was performed, it is possible to enlarge the display size of the site video of the site before the participant starts speaking.

The identification processing portion 184 identifies a speaker based on the motion of the mouth of each participant included in the site videos. For example, the identification processing portion 184 executes a known face detection process on the site videos to detect the position of a feature point of the mouth (for example, the position of the upper lip or the position of the lower lip) of each participant, and determines whether or not a participant is speaking, based on a temporal change of the position of the feature point.

The combining processing portion 183 may cut out, from a site video, a partial video of a speaker identified by the identification processing portion 184, and combine, as the site video, the cut-out partial video into the composite video. For example, the combining processing portion 183 may cut out, as the partial video, a rectangular region including the speaker at its center, from the site video, enlarge the partial video, and combine, as the site video, the enlarged partial video into the composite video. This makes it possible to, in a case where a lot of participants are included in a site video, cut out only a speaker among the participants and display the cut-out partial video in an enlarged size.

Figure 8:
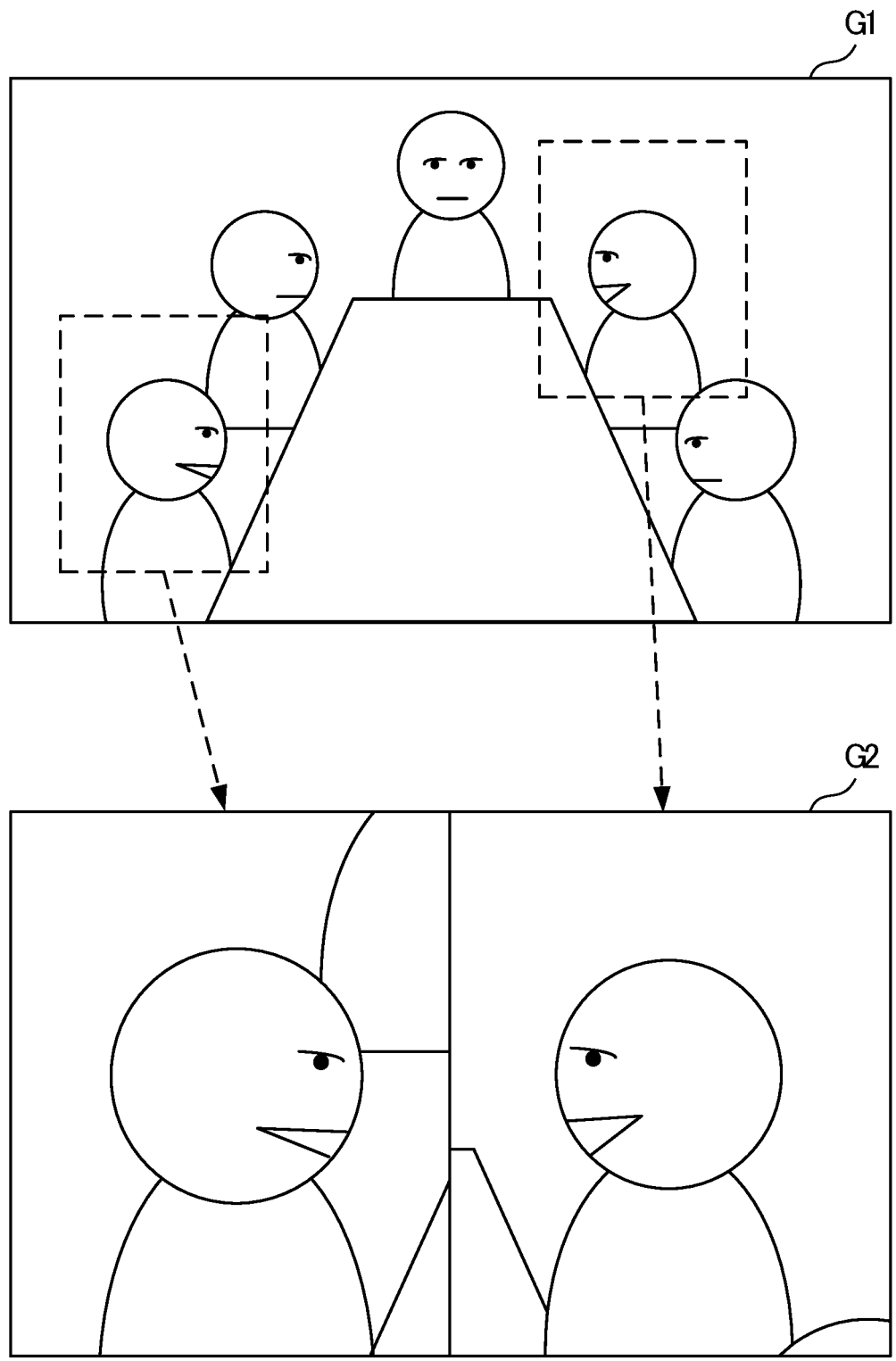
FIG. 8 is a diagram for explaining a site video cut-out process executed in the video conferencing apparatus according to the embodiment of the present disclosure.

In addition, when the identification processing portion 184 identifies two or more speakers in a same site video (for example, the site video G1 shown in FIG. 8), the combining processing portion 183 may cut out partial videos of the speakers from the site video, enlarge the partial videos, generate a screen-split video (for example, a screen-split video G2 shown in FIG. 8), and combine, as the site video, the screen-split video into the composite video. In a case where two or more participants in the same site are speaking with each other, it is possible to cut out the participants and display them in an enlarged size.

[Composite Video Generating Process]

In the following, with reference to FIG. 5, a description is given of an example of the procedure of the composite video generating process executed by the control portion 18. Here, steps S1, S2, . . . represent numbers assigned to the processing procedures (steps) executed by the control portion 18. It is noted that when an operation to start a video conferencing is performed on a video conferencing apparatus 1, the composite video generating process is started, and when an operation to end the video conferencing is performed on a video conferencing apparatus 1, the composite video generating process is ended.

Here, as one example, a description is given of an example of the procedure of the composite video generating process executed by the control portion 18 of the video conferencing apparatus 1A installed at the site A.

<Step S1>

First, in step S1, the control portion 18 acquires the site video data and the site sound data of the sites A to F. Specifically, the control portion 18 acquires the site video data and the site sound data of the site A from the camera 15 and the microphone 16 of the video conferencing apparatus 1A. In addition, the control portion 18 acquires the site video data and the site sound data of the sites B to F from the video conferencing apparatuses 1B to 1F via the communication network N1. The process of the step S1 is executed by the acquisition processing portion 181 of the control portion 18. The step S1 is an example of an acquisition step of the present disclosure.

<Step S2>

In step S2, the control portion 18 determines whether or not a layout update timing has come. For example, the layout update timing comes at a predetermined cycle (for example, every one second or every one minute). When it is determined that the layout update timing has come (S2: Yes), the process moves to step S3. On the other hand, when it is determined that the layout update timing has not come (S2: No), the process moves to step S4.

<Step S3>

Figure 6:
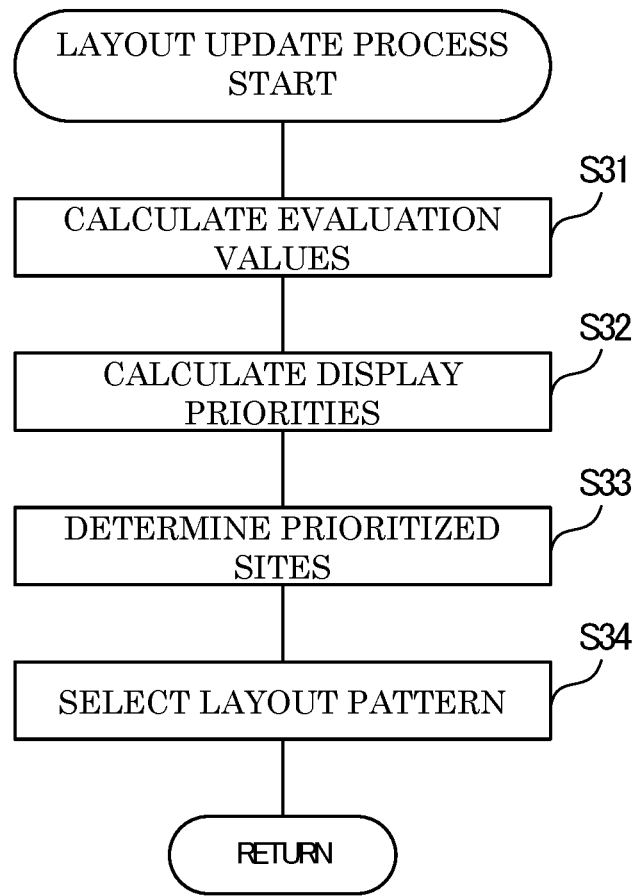
FIG. 6 is a flowchart showing an example of a layout update process executed in the video conferencing apparatus according to the embodiment of the present disclosure.

In step S3, the control portion 18 executes the layout update process. In the following, the layout update process is described in detail with reference to FIG. 6.

<Step S31>

In step S31, the control portion 18 calculates evaluation values for a plurality of predetermined evaluation items (for example, four evaluation items "amount of speech", "number of participants", "shared image", and "important person") with respect to each of the sites. Subsequently, the control portion 18 stores the calculated evaluation values as the priority information D2 in the storage portion 14.

<Step S32>

In step S32, the control portion 18 calculates the display priority of each of the sites, based on the evaluation values calculated in the step S31. Subsequently, the control portion 18 stores the calculated display priorities as the priority information D2 in the storage portion 14. The process of the step S32 is executed by the calculation processing portion 182 of the control portion 18. The step S32 is an example of a calculation step of the present disclosure.

<Step S33>

In step S33, the control portion 18 determines one or more prioritized sites based on the display priorities calculated in the step S32. The prioritized sites are, among the sites A to F, sites that each have a display priority higher than a predetermined threshold.

<Step S34>

In step S34, the control portion 18 selects one layout pattern from a plurality of predetermined layout patterns based on the number of prioritized sites determined in the step S33. For example, when the number of prioritized sites is one, the control portion 18 selects the layout pattern (A) shown in FIG. 7; when the number of prioritized sites is two, the control portion 18 selects the layout pattern (B) shown in FIG. 7; and when the number of prioritized sites is three, the control portion 18 selects the layout pattern (C) shown in FIG. 7.

Figure 5:
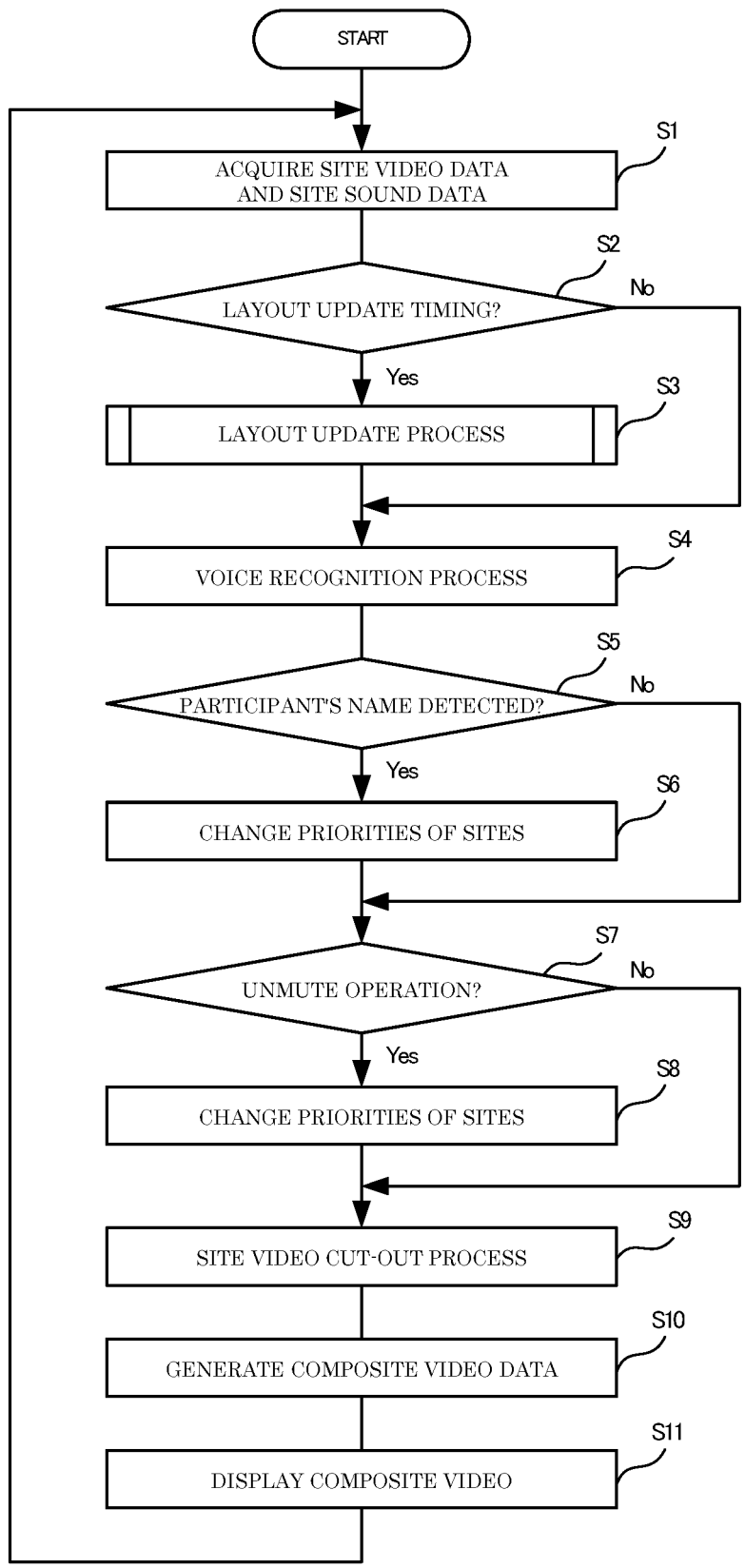
FIG. 5 is a flowchart showing an example of a composite video generating process executed in the video conferencing apparatus according to the embodiment of the present disclosure.

After the layout update process ends, the process moves to step S4 shown in FIG. 5.

<Step S4>

In step S4, the control portion 18 converts the site sounds of the sites A to F to text data by executing the voice recognition process on the site sound data of the sites A to F acquired in the step S1.

<Step S5>

In step S5, the control portion 18 determines whether or not a name of any participant included in the participant information D1 has been detected from the text data obtained in the step S4. When it is determined that a name of any participant has been detected (S5; Yes), the process moves to step S6. On the other hand, when it is determined that a name of any participant has not been detected (S5; No), the process moves to step S7.

<Step S6>

In step S6, the control portion 18 changes the priorities of the sites. Specifically, the control portion 18 raises the priority of a site at which a participant whose name was detected from the text data is present, to a priority (for example, to the first priority) that is higher than the current priority (namely, a priority determined based on the display priority calculated in the step S32).

<Step S7>

In step S7, the control portion 18 determines whether or not the unmute operation has been performed at any one of the sites A to F. When it is determined that the unmute operation has been performed at anu one of the sites (S7: Yes), the process moves to step S8. On the other hand, when it is determined that the unmute operation has not been performed at any one of the sites (S7: No), the process moves to step S9.

<Step S8>

In step S8, the control portion 18 changes the priority of the site. Specifically, the control portion 18 raises the priority of the site at which the unmute operation has been performed, to a priority that is higher than the current priority.

<Step S9>

In step S9, the control portion 18 executes a site video cut-out process. Specifically, the control portion 18 identifies one or more speakers based on the site video data of the sites A to F acquired in the step S1. The identification process is executed by the identification processing portion 184 of the control portion 18. Subsequently, the control portion 18 cuts out, as a partial video, a rectangular region including the speaker at its center, from the site video. It is noted that when a plurality of speakers are identified in a same site video, the control portion 18 cuts out a plurality of partial videos corresponding to the plurality of speakers, from the site video. It is noted that when no speaker is identified, cutting out of partial videos is not performed, and the process moves to step S10.

<Step S10>

In step S10, the control portion 18 generates composite video data based on the site video data of the sites A to F acquired in the step S1, wherein the composite video data represents a composite video which is a combination of site videos of the sites A to F. Specifically, the control portion 18 combines the site videos of the sites A to F based on the layout pattern selected in the step S34, and the priorities of the sites. For example, a site video of a site having the first priority is displayed in the site video display region R1, a site having the second priority is displayed in the site video display region R2, a site video of a site having the third priority is displayed in the site video display region R3, a site video of a site having the fourth priority is displayed in the site video display region R4, a site video of a site having the fifth priority is displayed in the site video display region R5, and a site video of a site having the sixth priority is displayed in the site video display region R6, based on the layout pattern selected in the step S34. The process of the step S10 is executed by the combining processing portion 183 of the control portion 18. The step S10 is an example of a combining step of the present disclosure.

It is noted that when one or more partial videos are cut out from a site video of any one of the sites A to F in the step S9, the control portion 18 combines a site video composed of the cut-out partial videos (for example, the screen-split video G2 shown in FIG. 8) into the composite video, instead of the whole site video including the cut-out partial videos.

<Step S11>

In step S11, the control portion 18 displays a composite video on the display portion 12 based on the composite video data generated in the step S10. The process then returns to step S1.

In the video conferencing apparatuses 1B to 1F too, as in the video conferencing apparatus 1A, the composite video generating process is executed by the control portion 18.

As described above, in the video conferencing apparatus 1 according to the present embodiment, display priorities of the sites are calculated based on evaluation values for a plurality of predetermined evaluation items, and a plurality of site videos having display sizes corresponding to the display priorities are combined into the composite video. As a result, for example, compared with a case where display sizes of the site videos vary based on only one evaluation item, it is possible to restrict display sizes of the site videos from varying at the dizzying pace. In this way, according to the video conferencing apparatus 1 of the present embodiment, it is possible to appropriately control the display sizes of the site videos captured at a plurality of sites.

Modifications

In the present embodiment, one layout pattern is selected from a plurality of predetermined layout patterns based on the display priorities of a plurality of sites. However, the present disclosure is not limited to this configuration. As another embodiment, a fixed layout pattern (for example, one of the layout patterns (A) to (C) shown in FIG. 7) may be always used regardless of the display priorities of the sites.

In addition, in the present embodiment, the composite video data is generated at each of the video conferencing apparatuses 1A to 1F. However, the present disclosure is not limited to the configuration. As another embodiment, one of the video conferencing apparatuses 1A to 1F may operate as a parent apparatus and generate the composite video data. In addition, the video conferencing apparatus 1 operating as the parent apparatus may transmit the composite video data to the other video conferencing apparatuses 1 operating as child apparatuses. This allows each of the child apparatuses to display a composite video on the display portion 12 based on the composite video data received from the parent apparatus.

In addition, as another embodiment, a video conferencing apparatus that operates as a parent apparatus (hereinafter, merely referred to as a parent apparatus) may be provided independently of the video conferencing apparatuses 1A to 1F. In this case, the parent apparatus receives the site video data from the video conferencing apparatuses 1A to 1F, and generates the composite video data based on the received site video data. The parent apparatus transmits the composite video data to the video conferencing apparatuses 1A to 1F operating as child apparatuses. This allows each of the video conferencing apparatuses 1A to 1F operating as child apparatuses to display a composite video on the display portion 12 based on the composite video data received from the parent apparatus.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A video conferencing apparatus comprising:
an acquisition processing portion configured to acquire site video data that represents site videos captured at a plurality of sites;
a calculation processing portion configured to calculate respective display priorities of the sites based on evaluation values for a plurality of predetermined evaluation items;
a combining processing portion configured to generate composite video data based on the site video data acquired by the acquisition processing portion, the composite video data representing a composite video which is a combination of a plurality of site videos having display sizes corresponding to the display priorities; and
an identification processing portion configured to identify a speaker based on a motion of a mouth of each participant included in the site videos, wherein
the combining processing portion cuts out, from a site video, a partial video of the speaker identified by the identification processing portion, and combines, as the site video, the cut-out partial video into the composite video.

2. The video conferencing apparatus according to claim 1, wherein
the plurality of evaluation items include at least two evaluation items out of: an evaluation item related to an amount of speech of a participant(s) at each of the sites; an evaluation item related to the number of participants at each of the sites; an evaluation item related to whether a shared image is provided from a site to another site; and an evaluation item related to whether a specific person is present at a site.

3. The video conferencing apparatus according to claim 1, wherein
the combining processing portion selects, based on the display priorities, one layout pattern from a plurality of predetermined layout patterns each showing a layout of the plurality of site videos in the composite video, and generates the composite video data based on the selected layout pattern.

4. The video conferencing apparatus according to claim 3, wherein
the combining processing portion selects the layout pattern based on the number of sites that each have a display priority higher than a predetermined threshold.

5. The video conferencing apparatus according to claim 1, wherein
when a name of a preliminarily registered participant is detected from site sounds collected at the sites, the combining processing portion enlarges display size of a site video of a site at which the preliminarily registered participant is present.

6. The video conferencing apparatus according to claim 1, wherein
when an unmute operation has been performed at any site among the plurality of sites, the combining processing portion enlarges display size of a site video of the site.

7. The video conferencing apparatus according to claim 1, wherein
when the identification processing portion identifies two or more speakers in a same site video, the combining processing portion combines, as the site video, a screen-split video that is composed of two or more partial videos of the speakers cut out from the site video, into the composite video.

8. A video conferencing method in which one or more processors execute:
an acquisition step of acquiring site video data that represents site videos captured at a plurality of sites;
a calculation step of calculating respective display priorities of the sites based on evaluation values for a plurality of predetermined evaluation items;
a combining step of generating composite video data based on the site video data acquired in the acquisition step, the composite video data representing a composite video which is a combination of a plurality of site videos having display sizes corresponding to the display priorities; and
an identification step of identifying a speaker based on a motion of a mouth of each participant included in the site videos, wherein
the combining step cuts out, from a site video, a partial video of the speaker identified by the identification step, and combines, as the site video, the cut-out partial video into the composite video.

* * * * *